United States Patent [19]

Hilbert

[11] 3,819,955

[45] June 25, 1974

[54] COUNTER CIRCUIT USING CURRENT SOURCE

[76] Inventor: Francis H. Hilbert, 124 E. Moreland, Addison, Ill. 60101

[22] Filed: Oct. 20, 1972

[21] Appl. No.: 299,427

Related U.S. Application Data

[63] Continuation-in-part of Ser. No. 165,958, July 26, 1971, abandoned.

[52] U.S. Cl. ............. 307/225 R, 307/227, 307/235, 307/255, 307/288, 330/30 D

[51] Int. Cl. ............................................ H03k 25/02

[58] Field of Search........ 307/227, 246, 255, 225 R, 307/288, 235, 237; 328/186; 330/30 D

[56] References Cited

UNITED STATES PATENTS

| | | | |
|---|---|---|---|
| 3,113,221 | 12/1963 | Okuda | 307/225 R |
| 3,378,698 | 4/1968 | Kadah | 307/225 R |
| 3,382,375 | 5/1968 | Dischert | 307/225 R |
| 3,577,012 | 5/1971 | Dummlermuth | 307/225 R |

*Primary Examiner*—John S. Heyman
*Attorney, Agent, or Firm*—Mueller, Aichele & Ptak

[57] ABSTRACT

An integrated counter circuit includes a charge storage capacitor having a charging path connected in series with an interrupted current source which is rendered alternately conductive and nonconductive by the input signal pulses or cycles which are to be counted by the circuit. The charge on the capacitor is applied to one input of a regenerative threshold switch which is supplied with a reference potential to establish the switching level. When the charge on the capacitor becomes sufficiently high enough the regenerative switch is rendered conductive and rapidly discharges the capacitor. To enhance the sharpness of the switching point of the regenerative switch, an attenuated input signal at the frequency used to switch the current source is applied to one of the inputs of the regenerative switch.

4 Claims, 2 Drawing Figures

INVENTOR
FRANCIS H. HILBERT
BY Mueller & Aichele
ATTORNEYS.

COUNTER CIRCUIT USING CURRENT SOURCE

This is a continuation, of application Ser. No. 165,958, filed July 26, 1971 and now abandoned.

BACKGROUND OF THE INVENTION

Step counting circuits are used in a large number of applications for counting preestablished numbers of input pulses or waveform cycles and producing an output when this number of pulses or waveform cycles has been counted by the circuit. Counter circuits of this type are typically used as frequency dividers or as waveform generators and the like. A disadvantage of many prior art step counters is the large number of components which are required with many counters requiring two or more capacitors per counting stage. In addition, prior art staircase or step counters also often require transformers and a large number of components including several capacitors, diodes, and resistors. It is difficult to implement capacitors in monolithic integrated circuit form and resistors are wasteful of integrated chip area. A need exists, therefore, for an accurate staircase or step type of counter which is low in cost and readily adaptable to monolithic integrated circuit form.

SUMMARY OF THE INVENTION

Accordingly, it is an object of this invention to provide an improved counter circuit.

It is an additional object of this invention to use an interrupted current source in the charging path of a storage capacitor for a counter circuit, with the current source operation being controlled by the signals or pulses which are to be counted.

It is a further object of this invention to use a current source in the charging path for a charge storage capacitor in a counter circuit, with the charge stored on the capacitor being applied to an input of a regenerative switch or comparator circuit, one input of which also is supplied with a sequence of pulses to sharpen the switching point at which the charge stored by the charge storage capacitor causes the regenerative switch or comparator circuit to change states thereby providing a discharge path for the charge storage capacitor.

In accordance with a preferred embodiment of this invention, a counter circuit includes a charge storage capacitor connected in series with an electronic switch and a current source forming the charging path for the capacitor. Input signals are applied to the switch to render it alternately conductive and nonconductive to charge the charge storage capacitor by discrete increments. A comparator or threshold switch is connected with the charge storage capacitor and is rendered conductive in response to the attainment of the predetermined charge by the capacitor to provide a discharge path for the capacitor.

In a more specific embodiment of the invention, the threshold switch is a comparator provided with a reference signal on one of two inputs, and the other input is responsive to the charge on the charge storage capacitor. Input signal pulses at a frequency equal to or greater than the frequency of the signal used to operate the switch are applied to one of the two inputs of the comparator circuit to sharpen the switching point thereof.

DETAILED DESCRIPTION

Figure 1:
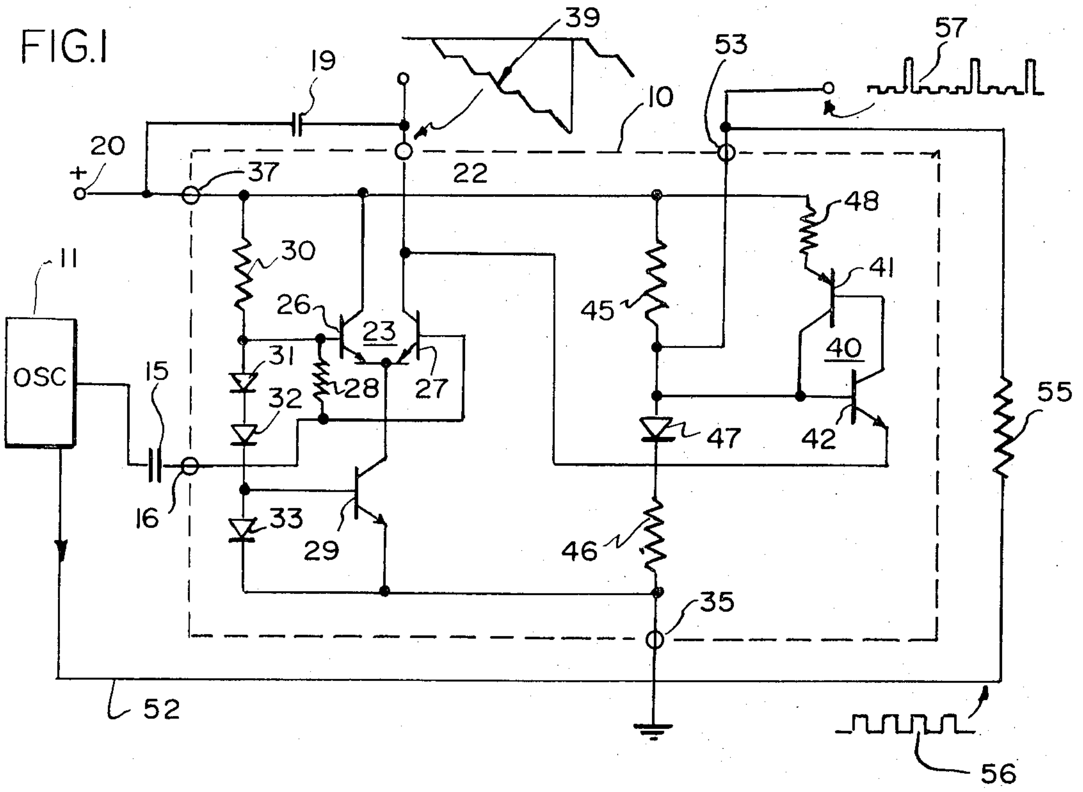
FIG. 1 is a detailed circuit diagram of a preferred embodiment of the invention.

Referring now to FIG. 1, there is shown a ramp-staircase counter circuit 10 with the components enclosed in dotted lines being capable of fabrication as a monolithic integrated circuit. The circuit shown in FIG. 1 is operated as a frequency divider and is supplied with signals, the frequency of which is to be divided, from an oscillator 11 which may have a number of circuit configurations. The output of the oscillator 11 is supplied through a coupling capacitor 15 to a bonding pad 16 to form the input signal for the counter/divider circuit 10.

The counter circuit 10 uses a charge storage capacitor 19 connected between a terminal 20, supplied with positive potential, and a bonding pad 22 on the circuit 10. Charging of the capacitor 19 in discrete steps indicative of a count of a number of cycles of the oscillator output signal, is controlled by a differential amplifier switch 23 including a pair of NPN transistors 26 and 27. The switch 23 couples the bonding pad 22 with a constant current source transistor 29 on alternate half-cycles of the signal appearing on the input bonding pads 16.

The charging current for the capacitor is determined by the bias on the base of the transistor 29. This bias is established by a voltage divider comprising a resistor 30 and three diodes 31, 32 and 33. The base of the transistor 29 is connected to the junction between the diodes 32 and 33, and the emitter of the transistor 29 is connected to a grounded bonding pad 35, as is the cathode of the diode 33. As is well-known, the diode 33 provides temperature compensation for the base-emitter junction of the transistor 29 which provides a constant current at its collector over a relatively wide range of ambient temperatures and supply voltage variations.

To effect switching of the current source transistor 29 into and out of the charging path for the capacitor 19, the bonding pad 16 is connected to the base of the transistor 27 to alternately render the transistors 26 and 27 conductive on opposite half-cycles of the input signal. A reference voltage level for the differential switch 23 is obtained from the junction between the resistor 30 and the diode 31 and is applied directly to the base of the transistor 26 and through a signal decoupling resistor 28 to the base of the transistor 27. When the transistor 27 is rendered conductive for one half-cycle of an input signal waveform, the capacitor 19 charges from the potential applied to the terminal 20 through the capacitor, the bonding pad 22, the collector-emitter path of the transistor 27, and the constant current source transistor 29. The rate of charge or the charging ramp is determined by the current pulled by the constant current source transistor 29.

On the opposite half-cycle of the input signal waveform, the transistor 27 is rendered nonconductive to open the charging path for the capacitor 19 which then remains at the charge which is attained just prior to the opening of the charging circuit. During this opposite or alternate half-cycle, the transistor 26 is rendered conductive and operates as a current shunt, with current flowing from the terminal 20, through a bonding pad 37, the collector-emitter path of the transistor 26, and the current source transistor 29. On the next half-cycle of operation, the transistor 27 again is rendered conductive and the transistor 26 is rendered nonconductive, and the next step or charging ramp for the capacitor 19 takes place.

The waveform 39 indicates this alternate half-cycle charging of the capacitor 19, and this waveform appears on the bonding pad 22. The initial potential on the bonding pad 22 is a relatively positive potential, and the charge on the capacitor 19 at the bonding pad 22 is reduced on a step-by-step fashion to form the staircase wave 39 as the capacitor is charged toward the ground potential appearing on the bonding pad 35.

The charge on the capacitor 19 appearing at the bonding pad 22 and also on the collector of the transistor 27 is applied to one of two inputs of a regenerative switch or comparator circuit 40, including a PNP transistor 41 and an NPN transistor 42 having interconnected base and collector electrodes. The emitter of the NPN transistor 42 comprises the input of the regenerative switch 40 which is connected to the collector of the transistor 27, and the switching or reference level for the regenerative switch 40 is controlled by a voltage divider including a pair of resistors 45 and 46 and a temperature compensating diode 47 connected between the bonding pads 37 and 35, respectively. The junction of the resistor 45 and the diode 47 is connected to the junction of the collector of the transistor 41 with the base of the transistor 42 to provide a reference potential which establishes the threshold switching level of the regenerative switch 40. This reference potential is a relatively positive potential, but is lower than the potential initially appearing on the collector of the transistor 27 at the start of a cycle of operation of the counter/divider circuit. As a consequence, the transistors 42 and 41 are reverse-biased and are nonconductive until the charge on the capacitor 19 drops to a point sufficient to forward bias the transistor 42. When this occurs, a regenerative switching action takes place, and the transistors 41 and 42 both are rendered conductive, producing a positive going output pulse on an output bonding pad 53 connected to the junction of the collector of the transistor 41 with the resistor 45 and the diode 47. A load resistor 48 which connects the emitter of the transistor 41 to the bonding pad 37 is of relatively small value compared to the value of the resistor 45; so that with the transistors 41 and 42 conducting, a relatively high positive potential (near that applied to the terminal 20) appears on the collector of the transistor 41. When both transistors 41 and 42 conduct, this potential also appears on the emitter of the transistor 42 and rapidly discharges the capacitor 19 to its initial or most positive value, as indicated by the waveform 39. The switch 40 then once again is rendered nonconductive, and the next cycle of operation begins.

Through the use of the interrupted current source to control the charging of the capacitor 19, the voltage level between each of the various steps in the staircase waveform 39 is the same for an input signal of a given frequency. The charging of the capacitor 19, however, is not instantaneous for each of these steps; so that a possible phase ambiguity in the output signal waveform on the output bonding pad 50 can occur as a result of triggering of the regenerative switch 40 at slightly different points on the ramp of the waveform 39 during the charging step of the capacitor 19 which renders the switch 40 conductive. Of course the steeper the ramp in each of the charging steps, the less will be any such phase ambiguity; but as a practical matter, the charge on the capacitor 19 does not take place in instantaneous steps.

in order to reduce the phase ambiguity between successive output pulses on the bonding pad 53 an attenuated square wave signal 56 is supplied by the oscillator 11 over a lead 52 to the bonding pad 53. Thus, signals appearing on the bondying pad 53 supplement or are added to the reference signal at the junction of the resistors 45 and 46. The square wave signal applied over the lead 52 is at the same frequency as the signal applied to the bonding pad 16 and is attenuated by a resistor 55, so that the peak-to-peak excursions of the signal, superimposed on the output waveform 57, are less than the magnitude of charge attained by the capacitor 19 in each of the discrete charging steps effected when the transistor 27 is rendered conductive. The particular amplitude of this attenuated signal within this limit is selected to be sufficient to sharpen the switching point of the switch 40 to reduce phase ambiguity. Instead of being applied to the bonding pad 53, the attenuated signals on the lead 52 could be applied to the bonding pad 22 with the same results.

For the purposes of illustration, assume that the transistor 27 is nonconductive during the positive portions of the waveform 56 and is rendered conductive during the negative portions of the waveform 56. The waveform 56 originates in the same oscillator 11 which supplies the switching signals to the bonding pad 16, and the waveform 56 is locked in frequency and in phase with the switching signals applied to the differential switch 23. When the transistor 27 is conductive to cause an increase (toward ground) in the charge on the capacitor 19, the negative portion of the waveform 56 applied to the junction of the resistors 45 and 46 causes the bias or reference potential applied to the threshold switch 40 to be reduced from its nominal value by an amount determined by the magnitude of the waveform 56. This then causes a slight reduction in the reference potential on the base of a transistor 42, so that the potential applied to the input of the emitter of the transistor 42 would have to be a lower potential to cause switching of the regenerative switch 40 to its conductive state than if the negative portion of the waveform 56 were not applied to the junction of the resistors 45 and 46. This retards the switching action of the negative half-cycles of the waveform 56.

On the next half-cycle of operation (the positive half-cycle of the waveform 56), the transistor 27 is rendered non-conductive, terminating the charging ramp on the capacitor 19. At this time the potential on the reference input of the regenerative switch 40 increases above the nominal potential by the amount of the positive portion of the waveform 56. If this is the step at which the switch 40 is to be rendered conductive, the increased positive potential on the base of the transistor 42 is sufficient to forward bias the transistor 42 into conduction, causing the regenerative switching action which has been described previously. Thus, this switching action occurs at the end of a full charging ramp or step of the capacitor 19 and causes the switching of the regenerative switch 40 to occur at the same phase of the input signal for each operation of the switch 40.

Figure 2:
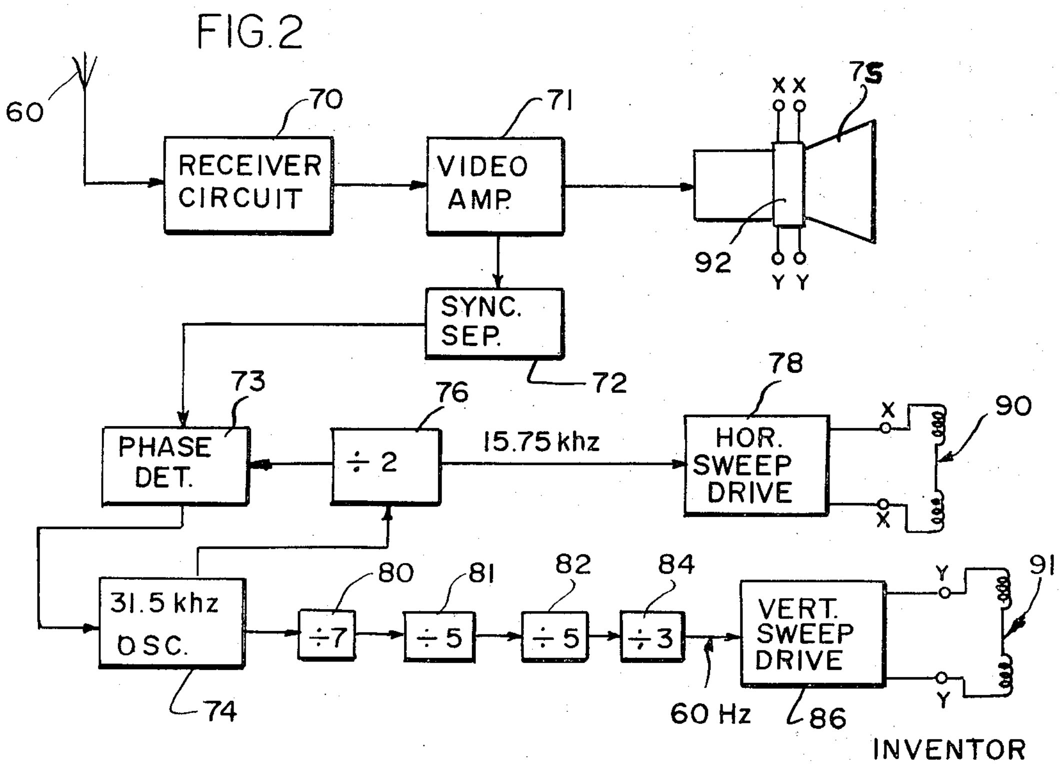
FIG. 2 is a block diagram of a television receiver circuit in which several circuits of the type shown in FIG. 1 may be utilized.

Referring now to FIG. 2, there is shown a block diagram of a television receiver in which several step divider or counter circuits of the type shown in FIG. 1 may be used for controlling the vertical and horizontal sweep systems of the television receiver from a single basic oscillator source to provide a proper interlace of the vertical and horizontal deflection signals. The circuit shown in FIG. 2 comprises an antenna 60 for supplying input signals to a receiver circuit 70, which may be of a conventional type and includes the necessary circuits for receiving and processing a composite television signal. The output of the receiver circuit 70 is applied to a video amplifier circuit 71 which supplies signals to a cathode ray tube 75 for reproduction on the screen thereof. The output of the video amplifier stage 71 also is supplied to a sync separator circuit 72 which supplies the synchronizing signals from the composite television signals to a phase detector circuit 73.

The phase detector circuit 73 is used to control the frequency of a reference oscillator 74 which preferably operates at 31.5 kilohertz. The output of the oscillator 74 is supplied to a divide-by-two counter 76 of any suitable type, with the output of a counter 76 supplying 15.75 kilohertz horizontal synchronizing signals to a horizontal sweep drive circuit 78, The output of the counter 76 also is supplied to one of the two inputs of the phase detector 73 for comparison therein to phase lock the operation of the oscillator 74 to the incoming synchronizing signals obtained from the sync separator circuit 72.

The output of the oscillator 74 also may be applied through a chain of four frequency dividers of the type shown in FIG. 1 to obtain the vertical synchronizing signals for the television receiver. The first of these dividers is a divide-by-7 divider 80, supplying output signals to a divide-by-5 divider 81, which supplies output signals to a divide-by-5 divider 82, the output of which is supplied to a final divide-by-3 divider 84. The output of the divide-by-3 divider 84 then constitutes the desired 60 Hertz vertical synchronizing signals and is applied to a vertical sweep drive circuit 86 to control the operation thereof.

Because the vertical synchronizing signals and the horizontal signals both are derived from the same basic frequency source, the circuit shown in FIG. 2 provides proper interlace between the horizontal and vertical deflection signals. The output of the horizontal sweep drive circuit is applied to a horizontal deflection coil 90, and the output of the vertical sweep drive circuit 86 is applied to a vertical deflection coil 91, with both deflection coils 90 and 91 located on a deflection yoke 92 on the cathode ray tube 75.

To cause the switching decision point of the regenerative switches 40 in each of the dividers 80, 81, 82 and 84 to be at the same point in each step of the dividers, the basic 31.5 kilohertz oscillator frequency may be supplied to the reference point of the threshold switches in each of these dividers, in the manner shown in FIG. 1. As an alternative, the attenuated signals 56 applied to the bonding pads 53 in the dividers 81, 82 and 84 each could be obtained from the output of the preceding divider which is used to drive the differential switch 23.

The output signals on the bonding pad 53 of the divider stages 80, 81 and 82 are applied as single-ended inputs to the base of the transistor 27 in the next succeeding stage. When such a single-ended input is employed, the base of the transistor 26 in each stage is connected to the voltage divider 30, 31, 32 and 33, as shown in FIG. 1. The operation of the differential switches 23 and regenerative switches 40 in the divider stages 80, 81, 82 and 84 is the same as the operation which has been describe in conjunction with the circuit shown in FIG. 1.

It should be noted that for each dividing or counting stage, only a single storage capacitor 19 is necessary. In addition, all of the circuit components shown located within the dotted lines in FIG. 1 may be formed on a monolithic integrated circuit chip, and interconnections of a number of divider stages on the same chip readily may be effected.

Theoretically, the division of the output of the oscillator 74 down to 60 Hertz could be accomplished in a single divider stage. As a practical matter, however, this would result in such a small increment of charge for each step, that the threshold detector or comparator could not be made sensitive enough to distinguish the proper step at the desired switching point. This is the reason that the frequency division in the circuit of FIG. 2 is done in the four divider stages 80, 81, 82 and 84.

It should be noted that the attenuated signal waveform applied to the bonding pad 53 to sharpen the switching point does not need to be square wave signal, but could be in the form of narrow pulses (positive for the circuit shown in FIG. 1) at the desired frequency. Such narrow pulses would further restrict the switching point of the switch 40 to a narrow window on the ramp of the waveform 39 causing the switching.

I claim:

1. A circuit including in combination:

first and second voltage supply terminals; a charge storage capacitor;

a constant current source coupled in series with said charge storage capacitor between said first and second voltage supply terminals in a charging path for said charge storage capacitor for charging said charge storage capacitor for a predetermined time interval over a predetermined range of amplitude;

a normally non-conductive comparator circuit comprising first and second transistors of opposite conductivity type, each of said transistors having base, collector, and emitter electrodes, the emitter of said first transistor being coupled with said first voltage supply terminal, the collector of said first transistor being coupled at a junction with the base of said second transistor to form a first input of said comparator circuit, the collector of said second transistor connected to the base of said first transistor, and the emitter of said second transistor comprising both a second input of said comparator circuit and a discharge path connection for said charge storage capacitor;

a voltage divider connected between said first and second supply terminals for supplying a reference voltage coupled to said first input of said comparator circuit for establishing a reference switching level therefor;

means for coupling said charge storage capacitor with said second input of said comparator circuit means;

means for supplying pulses having a predetermined maximum amplitude and a predetermined frequency to the first input of said comparator circuit during said predetermined time interval, the maximum amplitude of the applied pulses being less than the predetermined range of amplitude over which said charge storage capacitor is charged, the comparator circuit being rendered conductive upon the coincidence of a predetermined charge attained by said charged storage capacitor and the application of one of said pulses to discharge said charge storage capacitor.

2. A counter circuit providing an output pulse in response to a predetermined number of input pulses of equal duration including in combination:

first and second voltage supply terminals;

a charge storage capacitor having first and second terminals, the first terminal of which is coupled with the first voltage supply terminal;

a differential switch including first and second transistors, each having collector, base and emitter electrodes, with the collector electrode of the first transistor coupled with the first voltage supply terminal and the collector electrode of the second transistor coupled with the second terminal of the charge storage capacitor;

a constant current source transistor coupled between the second voltage supply terminal and the emitters of the first and second transistors;

means for applying a reference biasing potential to the base of at least one of the first and second transistors;

means for applying input pulses to the base of at least one of the first and second transistors to alternately render the first and second transistors conductive and non-conductive to charge the charge storage capacitor by the same amount in each of a number of discrete steps; and comparator circuit means having first and second inputs and coupled with the second terminal of the charge storage capacitor and responsive to a predetermined charge attained by the charge storage capacitor for providing a discharge path for the charge storage capacitor;

means for supplying a reference potential to the first input of the comparator circuit means to establish said predetermined charge at which the discharge path is provided for the charge storage capacitor;

means for coupling the second terminal of the charge storage capacitor to the second input of the comparator means; and means for applying additional pulses at a frequency equal to or greater than the highest repetition frequency of the input pulses to one of the first and second inputs of the comparator circuit means, the magnitude of the additional pulses being no greater than the maximum discrete increment of charge attained by the charge storage device in response to application of an input pulse to the differential switch.

3. The combination according to claim 2 wherein the comparator circuit means includes third and fourth transistors of opposite conductivity type, each having collector, base, and emitter electrodes, and wherein the means for supplying the reference voltage includes a voltage divider connected between the first and second voltage supply terminals, the emitter of the third transistor being coupled with the first supply terminal, the collector of the third transistor being connected to the base of the fourth transistor at a junction comprising the first input to the comparator circuit means the base of the third transistor being connected to the collector of the fourth transistor, and the emitter of the fourth transistor comprising the second input of the comparator circuit means.

4. A counter circuit providing an output pulse in response to a predetermined number of cycles of an input signal of a predetermined frequency and having a first and second condition on each cycle thereof including in combination:

a charge storage device;

a signal operated active constant current source means coupled in a series charging path with the charge storage device;

means for applying the input signal to the constant current source means to render the constant current source means alternately conductive and non-conductive in response to said first and second conditions, respectively, to charge the charge storage device from the current source means by the same incremental charge in each of a number of discrete steps;

normally non-conductive switch means coupled in a discharge path with the charge storage device and having at least one input coupled to respond to the potential stored by the charge storage device;

means for applying pulses to the switch means at a frequency equal to or greater than the frequency of the input signal and having an amplitude less than the incremental charge attained by the charge storage device in each discrete step to render the switch means conductive in response to the simultaneous application thereto of a predetermined charge on the charge storage device and one of said pulses.

* * * * *

UNITED STATES PATENT OFFICE
CERTIFICATE OF CORRECTION

Patent No. 3,819,955 Dated June 25, 1974

Inventor(s) Francis H. Hilbert

It is certified that error appears in the above-identified patent and that said Letters Patent are hereby corrected as shown below:

On the cover sheet insert [73] assignee: Motorola, Inc., Franklin Park, Ill. --. Under "References Cited" insert the following:

| Patent No. | Date | Patentee | Classification |
|---|---|---|---|
| 3,031,583 | 4/24/62 | Murphy | 307-227 |
| 3,105,158 | 9/24/63 | Nichols | 302-246X |
| 3,310,688 | 3/21/67 | Ditkofsky | 330-30D |
| 3,376,431 | 4/2/68 | Merrell | 307-288 |
| 3,435,193 | 3/25/69 | Aitchison | 307-227X |
| 3,456,554 | 7/22/69 | Goodwin | 307-227X |

Signed and sealed this 19th day of November 1974.

(SEAL)
Attest:

McCOY M. GIBSON JR.
Attesting Officer

C. MARSHALL DANN
Commissioner of Patents